(12) United States Patent
Merkt

(10) Patent No.: US 7,992,649 B2
(45) Date of Patent: Aug. 9, 2011

(54) TURF LEVELING DEVICE

(75) Inventor: Eric Merkt, Athens, AL (US)

(73) Assignee: g2 turftools, inc., Athens, AL (US)

( * ) Notice: Subject to any disclaimer, the term of this patent is extended or adjusted under 35 U.S.C. 154(b) by 114 days.

(21) Appl. No.: 12/446,020

(22) PCT Filed: Nov. 19, 2007

(86) PCT No.: PCT/US2007/085122
§ 371 (c)(1),
(2), (4) Date: Apr. 17, 2009

(87) PCT Pub. No.: WO2008/064167
PCT Pub. Date: May 29, 2008

(65) Prior Publication Data
US 2010/0319942 A1    Dec. 23, 2010

(51) Int. Cl.
*A01B 31/00* (2006.01)
(52) U.S. Cl. .................................. 172/197; 172/445.1
(58) Field of Classification Search .................. 172/177, 172/445.1, 501, 684.5, 824–826, 448, 449, 172/605, 503, 332, 239, 299, 197; 37/122–128, 37/133, 136, 117.5; 404/96, 106, 118
See application file for complete search history.

(56) References Cited

U.S. PATENT DOCUMENTS

| | | | |
|---|---|---|---|
| 4,196,778 A * | 4/1980 | Smith | 172/445.1 |
| 4,506,739 A | 3/1985 | Mascaro | |
| 4,655,297 A * | 4/1987 | Bourgeois, Jr. | 172/445.1 |
| 4,850,433 A * | 7/1989 | West | 172/32 |
| 4,924,945 A * | 5/1990 | Mork | 172/197 |
| 5,191,943 A * | 3/1993 | Minor et al. | 172/393 |
| 5,397,200 A * | 3/1995 | Seal | 404/118 |
| 5,511,625 A * | 4/1996 | Mork | 172/445.1 |
| 5,628,169 A | 5/1997 | Stiller et al. | |
| 5,771,669 A | 6/1998 | Langworthy et al. | |
| 6,412,258 B1 | 7/2002 | Doerflinger | |
| 7,063,165 B2 | 6/2006 | Bowsher | |

* cited by examiner

*Primary Examiner* — Robert E Pezzuto
(74) *Attorney, Agent, or Firm* — Joseph T. Guy; Nexsen Pruet, LLC

(57) ABSTRACT

A turf leveling device including a metering blade together with first and second horizontal and parallel main blades separated by first and second open distances. The blades are supported by a frame with spaced frame arms adapted to provide three point hitch attachment points. Skid plates mounted on left and right sides of the frame prevent the metering blade from scrapping or cutting elevated areas of the turf surface. The metering blade and the first and second main blades with deflectors effectively redistribute and level the gathered material. A vertically adjustable verticutting knife roller having keyed knife discs extending through slots in a grating insert is preferably disposed in the first open distance.

8 Claims, 9 Drawing Sheets

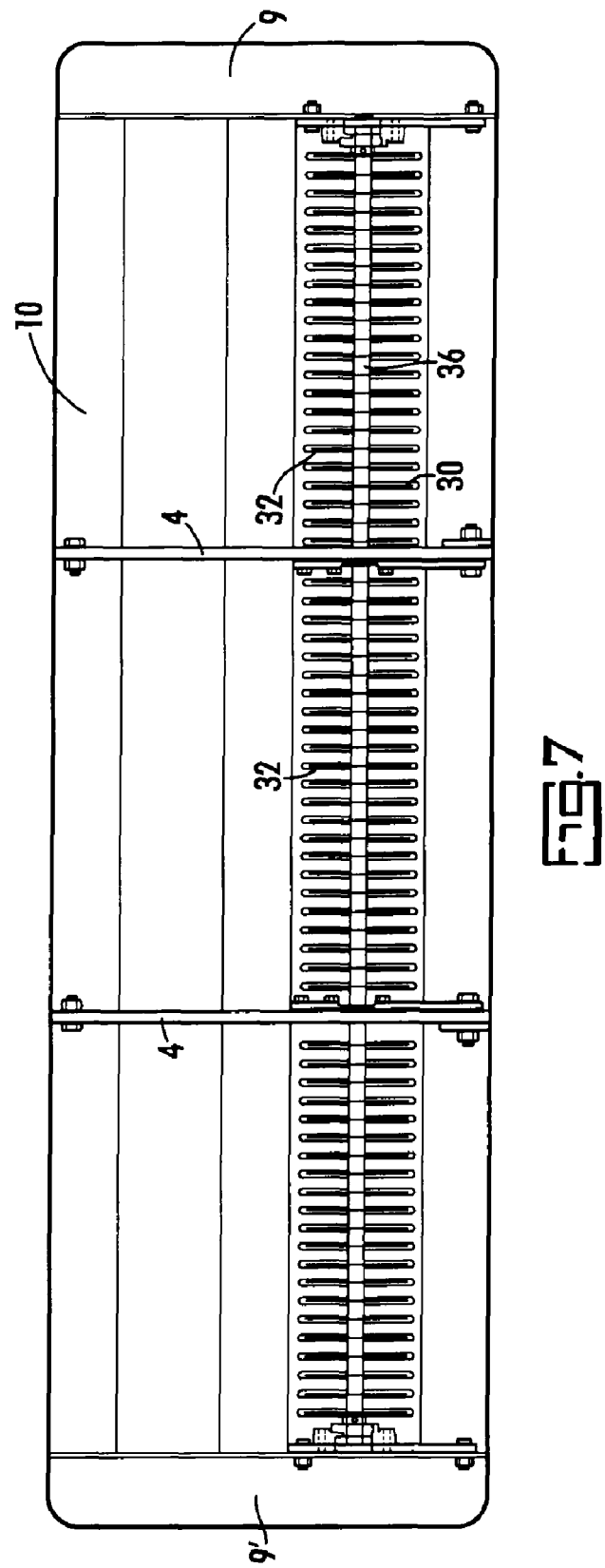

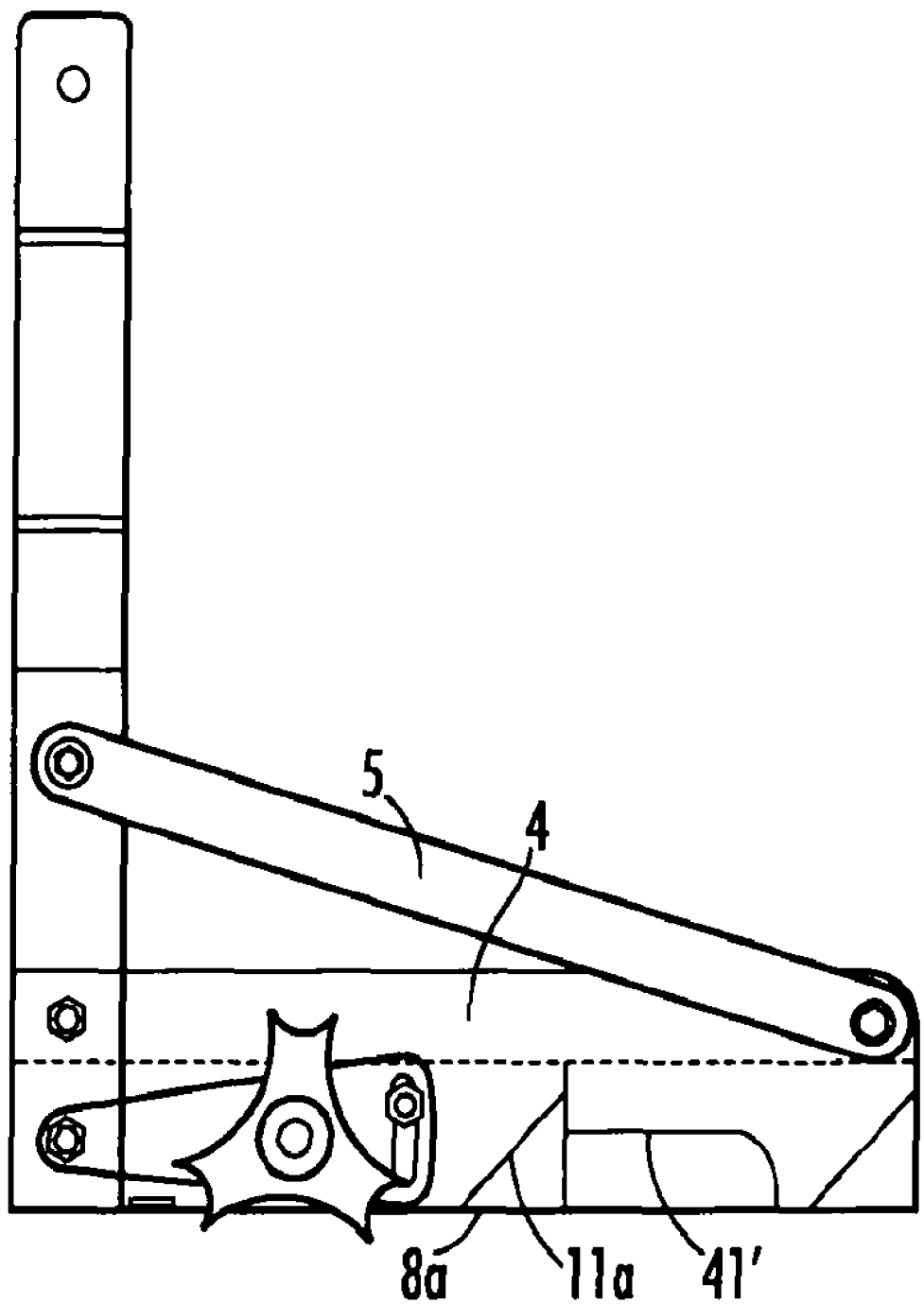

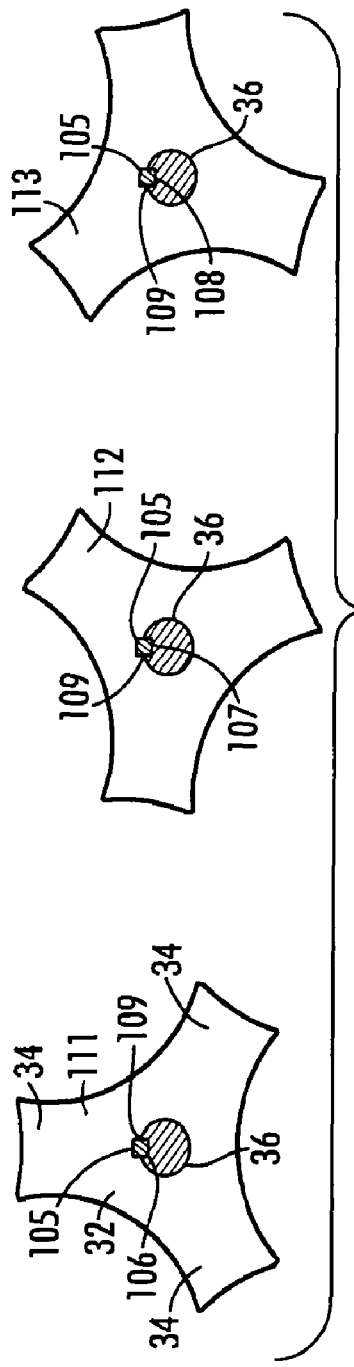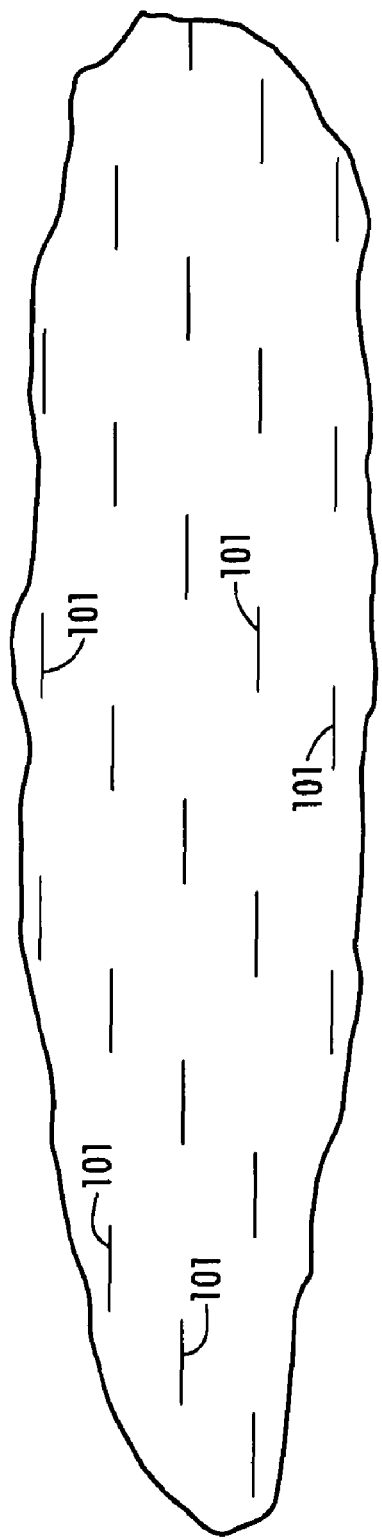

TURF LEVELING DEVICE

BACKGROUND OF THE INVENTION

The present invention relates generally to an apparatus and method of leveling a ground surface. More particularly, this invention pertains to an apparatus and method for leveling a surface of turf following core aeration and topdressing of the turf by means of a novel turf leveling device installed upon a tow vehicle. Turf maintenance is necessary to promote and maintain a healthy turf in residential lawns, golf courses, athletic fields and institutional landscaping. Common turf maintenance procedures include aeration, veritcutting, topdressing and turf leveling and are performed to increase air flow within the turf, decrease compaction of thatch and soil, and increase root growth. In order to promote vigorous growth necessary to maintain a healthy turf, groundskeepers periodically aerate the turf. Aeration is accomplished by pulling small dirt cores out of the green with a spike or core aerator. The cores may 1 be cleared away with the resultant loss of organic material. Removal of the cores and other debris may be accomplished manually or by use of a mechanized gathering and removal apparatus such as a drag tarp. Concomitant with core clearing is the cost of labor and/or the cost of specialized machinery for core clearing.

Veritcutting of rhizomes, stolons and crowns promotes new growth of the turf within the interstitial space between existing crowns. Veritcutting apparatus may be manual or mechanized, but generally requires mechanization for large areas of turf. Existing mechanized devices employ self-propelled or towed frames carrying cutting units of spaced circular discs with intermittently spaced verticutting blades for penetration through the thatch surface of the turf and into the ground surface.

Sand, a sand/peat mixture or some other topdressing material is then applied to the turf surfaces and is worked into the aeration holes. Topdressing can be worked into the turf manually with a rake or other similar tool. Incorporating topdressing manually is difficult and labor-intensive. Various prior art devices have been proposed to mechanize the process. Most of these devices, however, tend to leave ridges and piles of sand on the thatch surface of the turf.

Where cores and sand or soil deposits accumulate on the thatch surface or grass surface of the turf, they may be broken apart instead of removed. These deposits may be broken apart manually or by mechanized means such as harrows, drag mats and leveling blades which pulverize the cores and hard clumps of dirt. However, such machines are ineffective in redistributing the cores and topdressing from high points to depressions so as to level the turf surface. Leveling of the turf surface is a critical component of turf maintenance, especially for golf course and athletic field applications of turf systems. Current mechanized turf leveling devices do not adequately control their blading systems and the turf system may be damaged when the leveling blade cuts and scraps the elevated areas of the turf surface.

What is needed is a turf leveling device that can be used on uneven turf surfaces to level the turf surface without scrapping and cutting the elevated areas of the turf surface. What is also needed is a turf leveling device that can break apart and redistribute turf cores, dirt and topdressing materials so as to fill depressions in the turf surface without damaging the elevated areas of the turf surface.

BRIEF SUMMARY OF THE INVENTION

One preferred embodiment of the present invention is a turf leveling device, including: a metering blade, a first main blade disposed behind the metering blade by a first open distance, and a second main blade disposed behind the first main blade by a second open distance. Each blade is horizontally disposed parallel to each other and supported by a frame having blade skids mounted on its left and right ends. The frame is supported by spaced left and right frame arms, each arm having an implement pin and an implement pin hole and together providing attachment points for a three point hitch system of a towing vehicle. Two frame 3 braces each extend from the rear of the frame to a mid-point of the frame arms so as to provide rigid support and a constant angle between the frame arms and the frame.

With the turf leveling device mounted on a tractor and the angle of attack of metering blade set to be level relative to the skid plates, the skid plates preve nt metering blade from sinking below the thatch surface of the turf system as the turf leveling device is pulled forward and slides over the turf surface. As the metering blade encounters turf cores, clods of dirt and/or topdressing materials rising above the surface of the turf, those materials are gathered and disposed on top of metering blade. As gathered material reaches the rear of the metering blade, it falls through the first open distance. If the turf surface is depressed in the area into which the gathered material falls from the metering blade, the material automatically fills the depression in the turf surface. Until sufficient material is deposited in the depression to fill the depression, such gathered material dropped into the depression will be below the height of the approaching first main blade. However, if the turf surface at the point gathered material falls is level or elevated with respect to the skids, the material will remain above the height of the first main blade, which will gather the material a second time and deposit it on the first main blade.

As additional material is then gathered by the first main blade, it is pushed rearward across the blade where it encounters the first blade deflector. The first blade deflector angle of attack is selected so as to prevent excessive build up of gathered materials on the first main blade. This feature of the turf leveling device advantageously redistributes the gathered material both laterally and longitudinally with respect to the turf surface as well as with respect to the first main blade. As additional material is gathered by and accumulates on the first main blade, the material either preferentially drops over the front edge into a depression and passes beneath the first main blade or the material is carried over first blade deflector and drops into the second open distance. These processes are repeated a second time on the second main blade.

A second preferred embodiment of the present invention further includes a verticutting knife roller disposed within the first open distance and mounted on a shaft extending through the frame. The verticutting knife roller includes a plurality of vertically disposed keyed knife discs, each carrying a plurality of spaced verticutting blades. The keyed knife discs each extend through a slot in a grating insert disposed in the first open distance. The depth of the longitudinal cuts made by the verticutting blades is controlled by a blade depth positioning assembly. This second preferred embodiment operates as described above. except that turf cores and clumps of dirt gathered by the metering blade are cut and/or ground by the rotation of the verticutting knife roller.

Advantageously, the turf leveling device of the present invention is adapted to level turf surfaces having loose materials such as turf cores and topdressings unevenly dispersed on turf surfaces without scrapping and cutting the elevated areas of the turf surface. The turf leveling device of the present invention is adapted to break apart and redistribute turf cores, dirt and topdressing materials so as to fill depressions in the turf surface without damaging the elevated areas of the turf surface.

BRIEF DESCRIPTION OF THE SEVERAL VIEWS OF THE DRAWINGS

The invention is illustrated in the accompanying drawings in which:

FIG. 7 is an overhead view of the turf leveling device of FIG. 1 with the knife roller;

FIG. 8 is a vertical section showing an adjustable depth knife roller;

FIG. 9 shows three adjacent knifes keyed to a common shaft, and

FIG. 10 shows the turf cutting pattern effected by the rotating knifes.

DETAILED DESCRIPTION OF THE INVENTION

Figure 1:
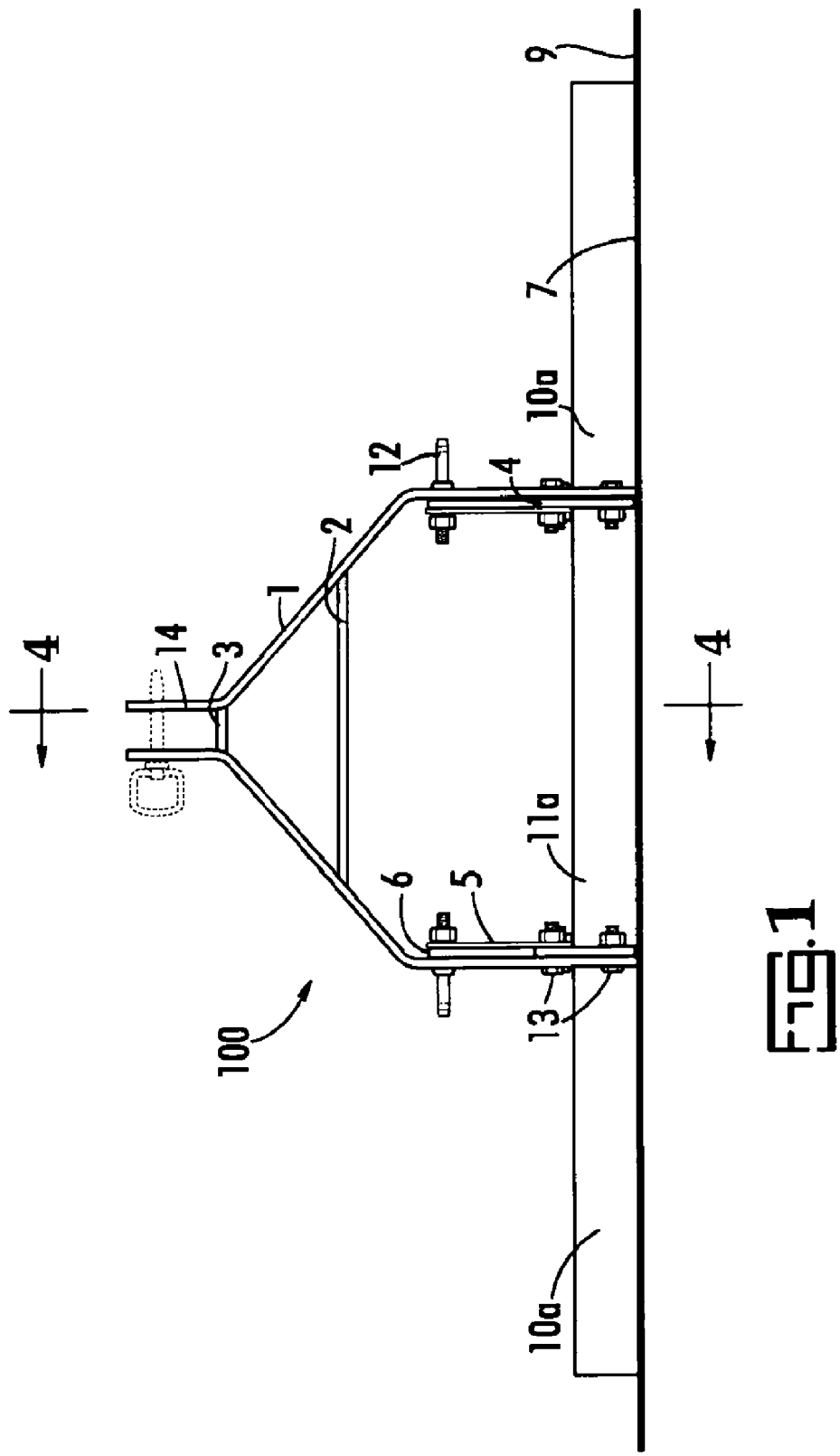
FIG. 1 is a front view of a preferred embodiment of the turf leveling device of the present invention.

One preferred embodiment of the present invention is a turf leveling device 100 shown in FIGS. 1-5. The turf leveling device 100 includes a metering blade 7, a first main blade 8a disposed behind the metering blade 7 by a first open distance 20, and a second main blade 8b disposed behind the first main blade 8a by a second open distance 22. The metering blade 7 and main blades 8a and 8b are coplanar and horizontally parallel tone another and are supported by the frame 4 and blade skids 9 mounted on the left and right ends of frame 4.

The turf leveling device 100 can be mounted on a light tractor or other similar towing vehicle by means of a 3 point hitch. As shown in FIG. 1, the main frame 4 includes fore and aft extending supports in the form of left and right frame arms 1 spaced apart by an upper space frame, spacer 3 and a lower frame spacer 2. An implement pin 12 is mounted on each frame arm 1. The two implement pins 12, in conjunction with the implement pin holes 14 at the upper ends of frame arms 1, provide attachment points for the three point hitch system of a towing vehicle. In a preferred configuration using a preferred embodiment of the present invention, the 3 point hitch system is adapted to control the height of the turf leveling device 100 and thus the height of the metering blade 7, which is horizontally parallel with frame 4.

Figure 3:
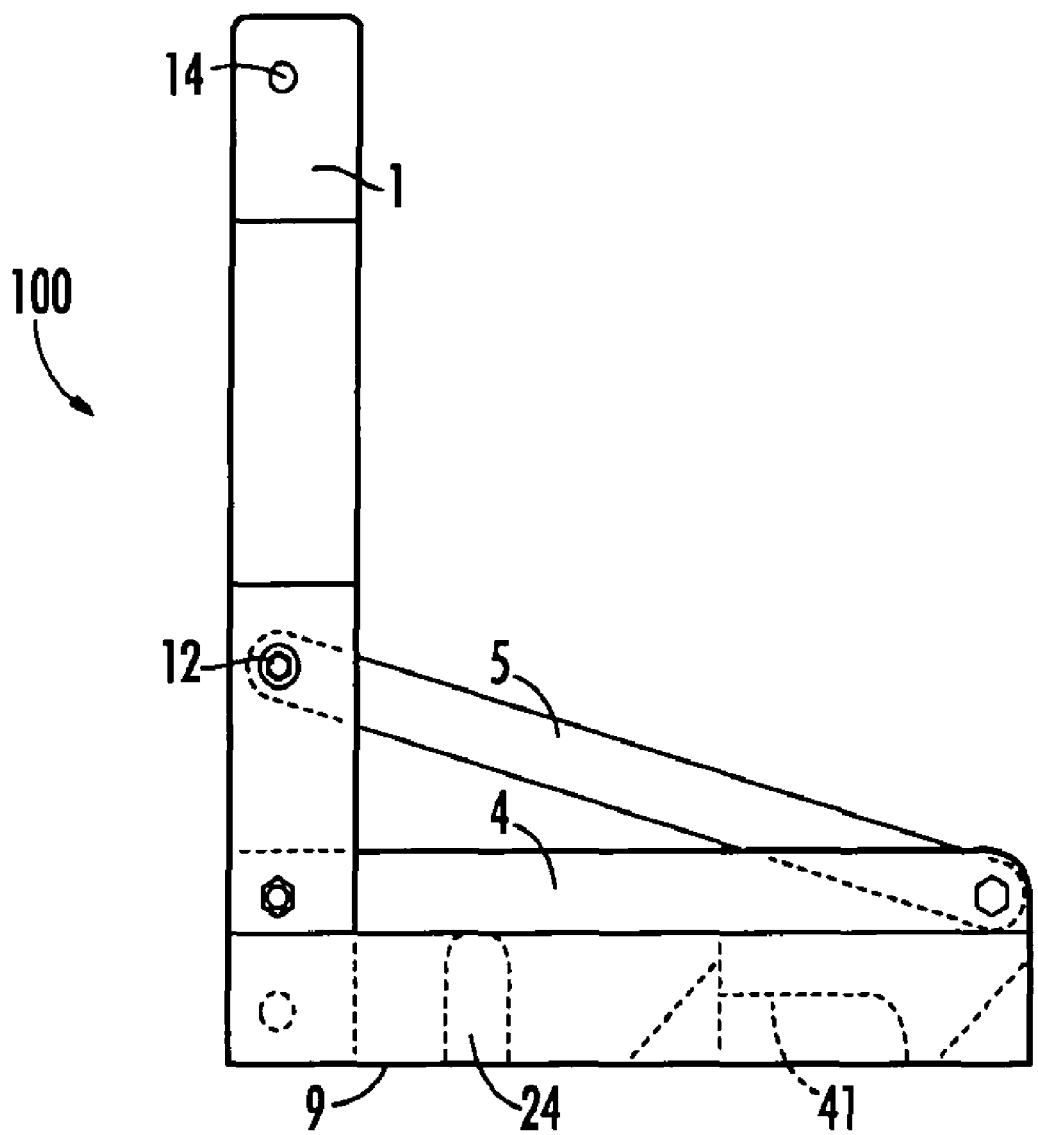
FIG. 3 is the left end view of the turf leveling device of FIG. 1.
Figure 4:
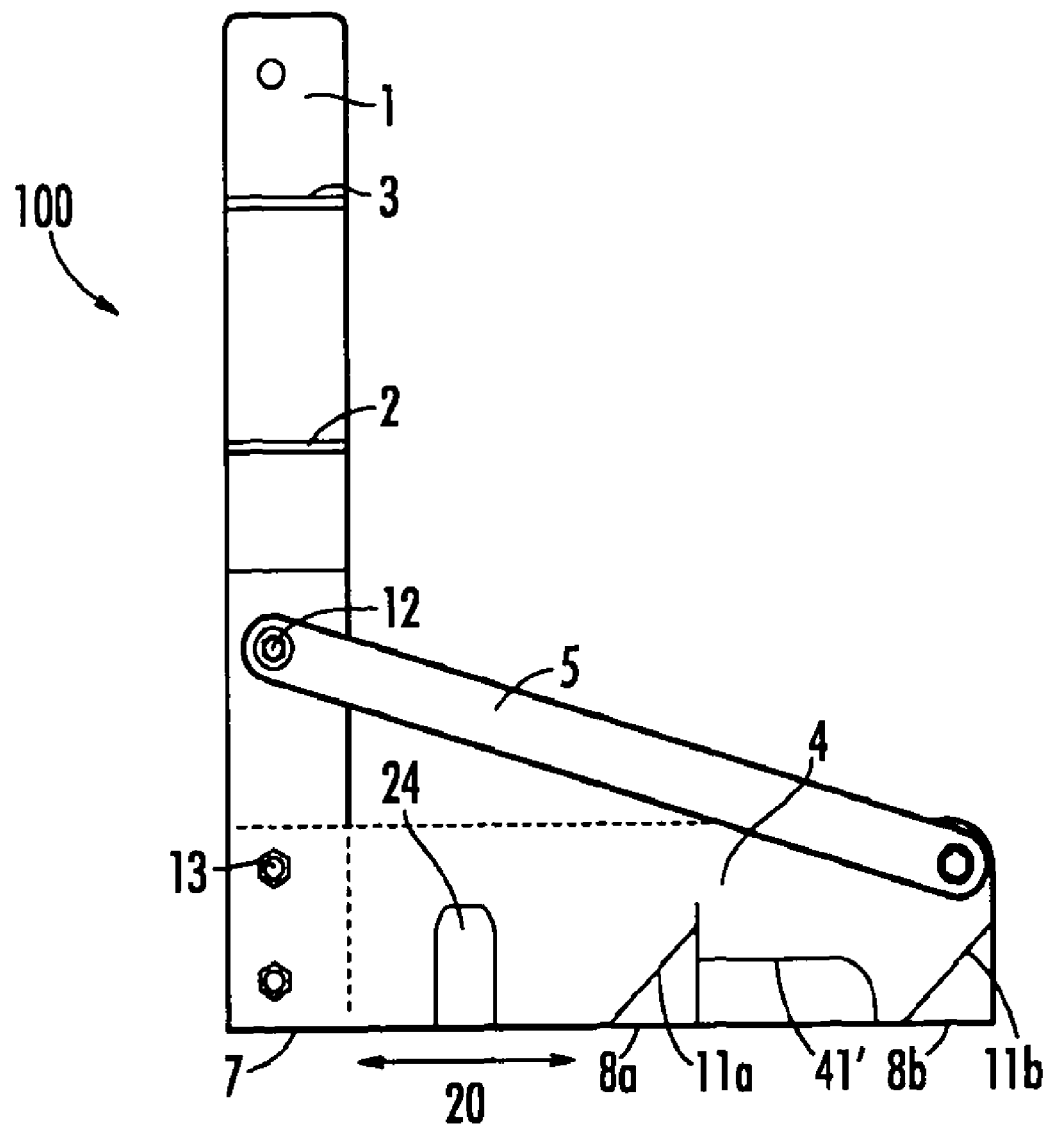
FIG. 4 is section taken on line 4-4 in FIG. 1.
Figure 5:
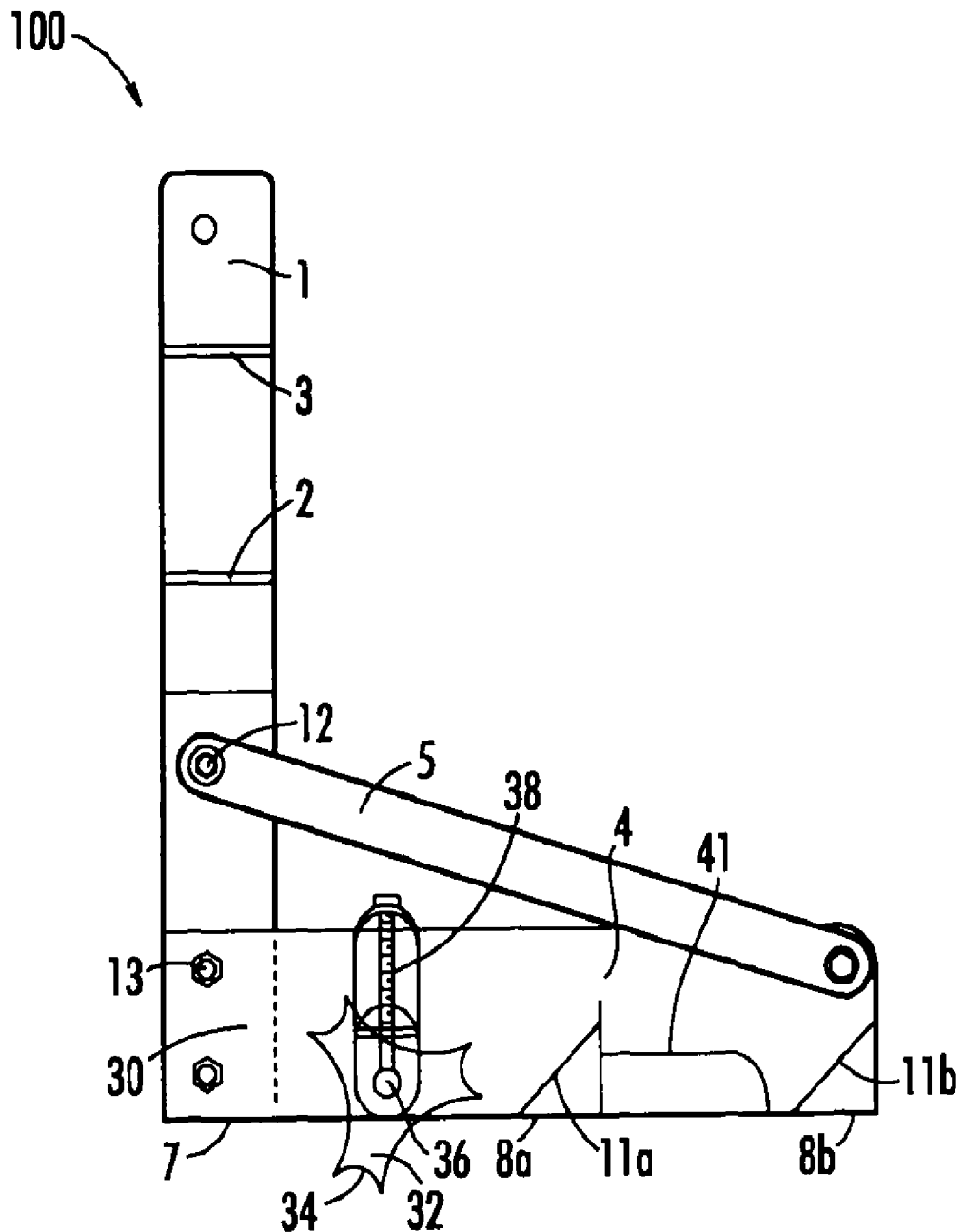
FIG. 5 is a view similar to FIG. 4 showing the addition of a knife roller.
Figure 6:
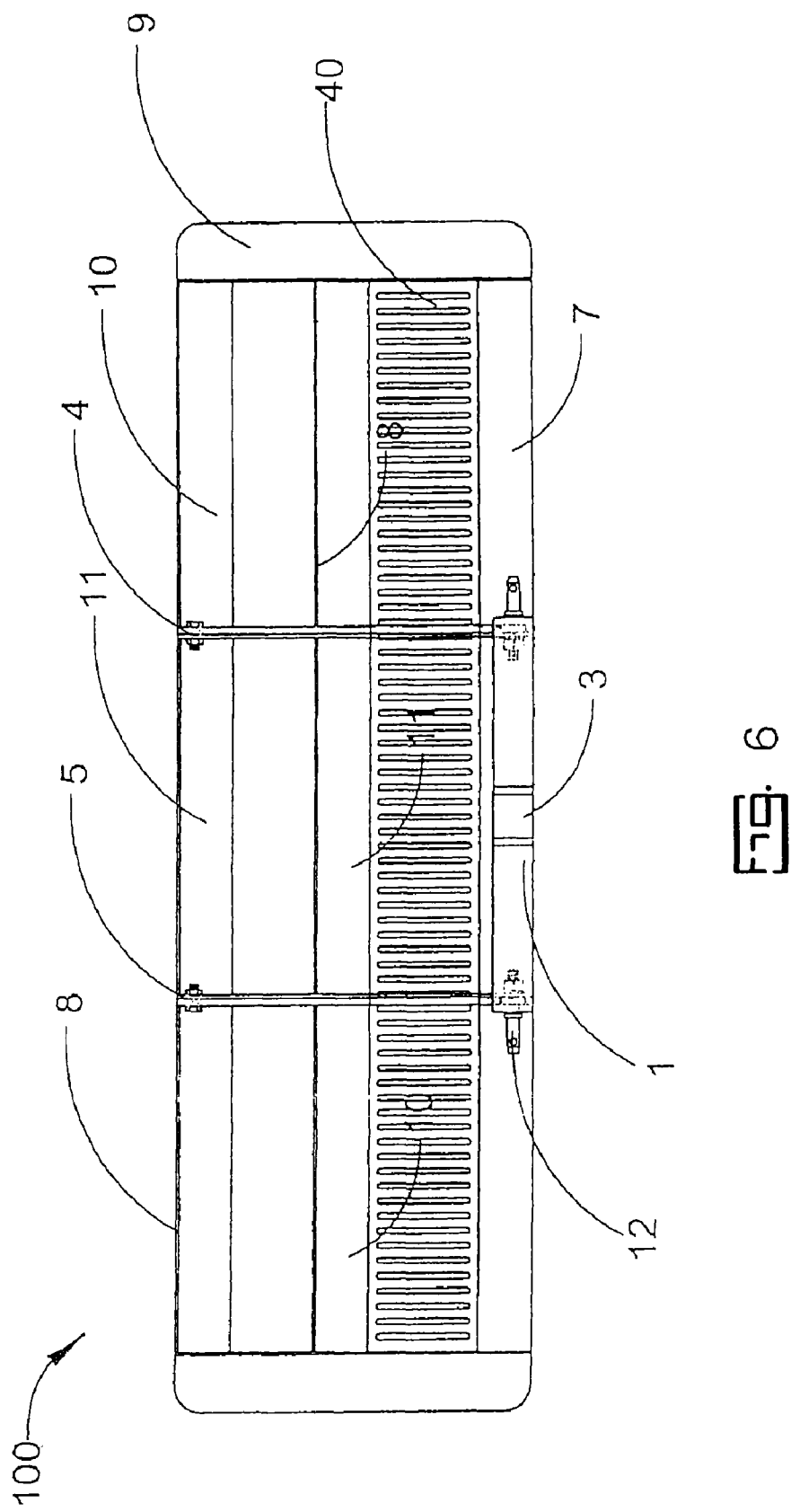
FIG. 6 is an overhead view of the turf leveling device of FIG. 5 without the knife roller.

Referring now to FIGS. 3 and 4, metering blade 7 is shown attached horizontally to and flush with the lower portion of frame 4, as are the first and second main blades 8a and 8b. In alternate embodiments (not shown) the metering blades and first and second main blades are mounted at a selected non-zero angle of attack relative to the skid plates. In other alternate embodiments (not shown) the metering blades and first and second main blades are mounted so as to be adjustable between selected angles of attack relative to the skid plates, including a zero 01' horizontal angle of attack. The two frame braces 5 each extend from the real' of frame 4 to a mid-point of the frame arms 1 so as to provide rigid support and constant angle between the frame arms 1 and the frame 4. In the preferred embodiment shown in FIGS. 3 and 4, the angle between the frame arms 1 and the frame 4 is a right angle. In the preferred embodiment shown, the frame braces 5 are solid bars and are not adjustable. In other preferred embodiments (not shown) the frame braces are adjustable in length. In yet other embodiments the attachment points between the frame braces and the frame arms and between the frame braces and the frame are adjustable. Such other preferred embodiments provide for adjustment of angle of attack of the metering blades.

With the turf leveling device 100 mounted on a light tractor or its equivalent, and the angle of attack of metering blade 7 may be leveled by means of adjustment of either the three point hitch or the frame brace 5. The flat horizontal metering blade 7 may be preferably set to level or a slightly positive angle of attack relative to the skid plates 9. As the turf leveling device 100 is pulled forward and sliding over the turf surface, the skid plates 9 prevent the metering blade 10 from sinking below the thatch surface of the turf system. Thus, in this configuration and level angle of attack, the skids 9 prevent the frame 4 and metering blade 7 from digging into the turf. As the metering blade 7 encounters turf cores, clods of dirt and/or topdressing materials rising above the surface of the turf, those materials are gathered and disposed on top of metering blade 7. Vibration of the turf leveling device 100 and the deposit of later gathered material displaces cumulative gathered material in both rearward and lateral direction across the flat metering blade 7. As gathered material reaches the rear of the metering blade, it falls through the first open distance 20. If the turf surface is depressed at the point the gathered material falls from the metering blade, the material automatically fills the depression in the turf surface. Until sufficient material is deposited in the depression to fill the depression, such gathered material dropped into the depression will be below the height of the approaching first main blade 8a. However, if the turf surface at the point on the turf where the gathered material falls is level or elevated with respect to the skids 9, the material will remain above the height of the first main blade 8a, which will gather the material a second time and deposit it on the first main blade 8a.

Figure 2:
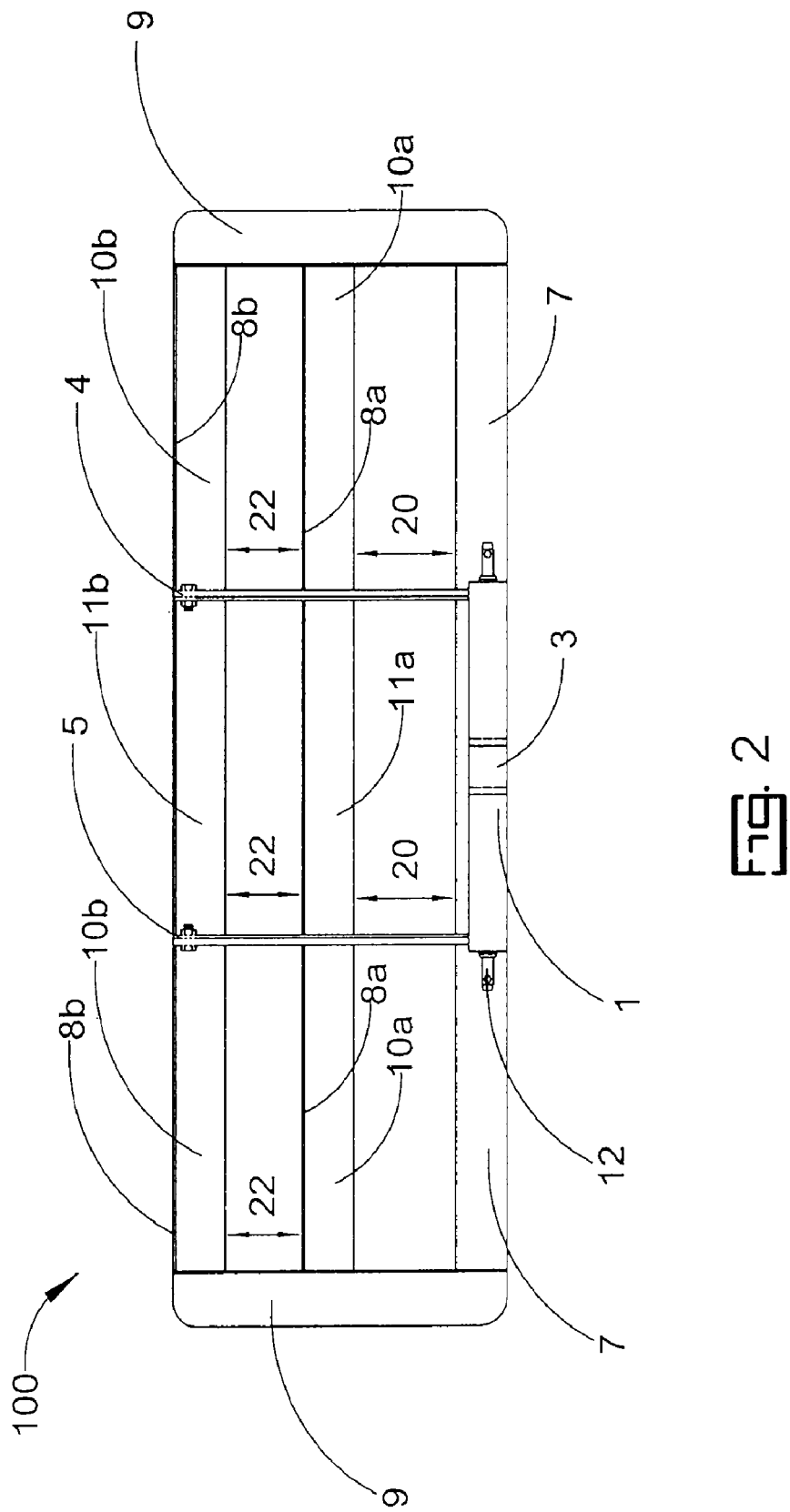
FIG. 2 is an overhead of the turf leveling device of FIG. 1.

As additional material is then gathered by the first main blade 8a it is pushed rearward across the blade 8a where it encounters the first blade deflector, which is shown in FIG. 2 as 11a for the center portion of the first blade deflector and 10a for the left and right side portions of the first blade deflector relative to the frame. The first blade deflector angle of attack can be selected so as to prevent excessive build up of materials gathered on the first main blade 8a. When gathered material accumulates excessively in one section of the blade 8a, the vibrations of the frame during operation and the effect of gravity on higher piles of loose gathered materials tend to move that portion of the gathered material laterally so as to fall into unoccupied portions of the main blade 8a. This feature of the turf leveling device 100 advantageously redistributes the gathered material both laterally and longitudinally with respect to the turf surface as well as with respect to the first main blade 8a. As additional material is gathered by and accumulates on the first main blade 8a. the material either preferentially drops over the front edge into a 9 depression and passes beneath the first main blade 8a or the material is carried over first blade deflector and drops into the second open distance 22 between the first main blade 8a and the second main blade 8b. These processes are repeated a second time in the second main blade 8b which will pick up any loose material above the set turf height and will move it laterally across the blade by means of the second blade deflector 11a in the center or the second blade deflector 10b in the side portions of the frame. Material accumulated in the second space 22 can move laterally through openings 41, 41' in the main frame 4.

Alternate embodiments of the present invention include a processing device (not shown) disposed in the first open space 20 as shown in positional cutouts 24 in FIGS. 4 and 3. The processing device optionally includes a shaft that extends through frame cutouts 24 and through the left and/or right side of frame 4. The shaft may be free rotating or driven so as to provide power to the processing device as desired. The processing device of one preferred embodiment includes a verticutting blade system disposed on a driven shaft. The processing device of another preferred embodiment includes a turf core grinding system disposed on a driven shaft and adapted to break apart turf cores, dirt clods and debris. In this embodiment (not shown) a series of closely spaced blades are mounted on a driven shaft and adapted to cut and grind turf cores, clumps of dirt inside so as to break apart the larger portions and allow them to become fine fill. One skilled in the art will recognize that other common turf maintenance devices may be incorporated as a processing device in other alternate embodiments of the present invention.

Referring now to FIGS. 5 through 10, a second preferred embodiment of the present invention is shown having features substantially as described above for the preferred embodiment shown in FIGS. 1-4 and further including a verticutting knife roller 30 disposed within the first open distance 20 and mounted by a key and keyway on a shaft 36 extending through frame cutouts 24. The verticutting knife roller 30 shown includes a plurality of vertically disposed keyed knife discs 32 mounted on the shaft 36 and separated by spacers as desired. The keyed knife discs 32 each carry a plurality of equally space verticutting blades 34 disposed on the circumference of the respective disc 32. On each keyed knife disc 32 the verticutting blades 34 are spaced apart so as to create longitudinal cuts in the turf of a selected length of cut and a selected spacing between cuts. The plurality of keyed knife discs 32 are spaced and oriented on the shaft 24 with respect to each other so as to achieve a selected lateral offset and a selected diagonal offset of the longitudinal cuts 101 made by adjacent knife rollers 32 as shown in FIG. 10. As shown in FIG. 9 the keyways 106, 107, 108 formed in knife discs 111, 112 and 113 are 40 degrees apart and the keyway 109 in the shaft 36 extends the full length of the shaft 36. The plurality of keyed knife discs 32 each extend through a slot in the grating insert 40. The depth of the longitudinal cuts made by the verticutting blades 34 is controlled by the blade depth positioning assembly 38 which adjusts and maintains the distance that the rotating discs 32 and carried blades 34 extend below the bottom of the grating insert 40, which is mounted to the frame 4 flush with the bottom of the frame 4 and flush with the skids 9. In preferred embodiments, the blade depth positioning assembly 38 is optionally biased so as to allow the verticutting knife roller 30 to be momentarily displaced by an impact and returns to its original position with respect to the grating insert 40. The cutting blades 34 each have radially inward disked circumferentially extending edges, the circumferential dimension of which is approximately one half the circumferential distance between the blades 34. The radially outer edge of each blade 34 captures turf material and turf cores and either shears it or pushes it into the opening formed by that blade. As shown in FIG. 10 the radius of the dished circumference of the blades and the radius of the curved edge between the blades is the same as the radius of the disc. The circumferential space taken up by the radially outer end of a blade one-ninth of the circumference of the disc.

This second preferred embodiment operates as described above, except that fine material gathered by the metering blade 7 falls between the grating spacing of the grating insert 40 disposed in the first open distance instead of just falling into the first open distance 20. Additionally, turf cores and clumps of dirt gathered by the first metering blade 7 are cut and ground by the rotation of the verticutting knife roller 30 so as to reduce their size.

Thus, although there have been described particular embodiments of the present invention of a new and useful Turf Leveling Device, it is not intended that such references be construed as limitations upon the scope of this invention except as set forth in the following claims.

What is claimed is:

1. A turf leveling device comprising:
   a metering blade horizontally disposed on a frame carrying left and right skid plates disposed flush with a lowest surface of the frame;
   a first main blade horizontally disposed on the frame so as to be separated from the metering blade by a first open distance, the first main blade having a first blade deflector disposed thereon;
   a second main blade horizontally disposed on the frame so as to be separated from the first main blade by a second open distance, the second main blade having a second blade deflector disposed thereon,
   wherein each blade is disposed flush with the right and left skid plates such that, with the device towed over a turf surface having elevated areas and depressions, the skid plates cause the metering blade to rise above elevated areas of the turf surface.

2. The turf leveling device of claim 1 having a knife roller including a shaft rotatably mounted on said frame between said first and second blades for rotation on a laterally extending horizontal axis, said knife roller having a plurality of axially spaced cutting discs keyed to a horizontal shaft.

3. The turf leveling device of claim 2 wherein each of said cutting discs has three radially extending blades which are spaced at equal circumferential intervals.

4. The turf leveling device of claim 3 wherein said blade has a radially inward disked circumference and said blade has a circumferential space taken up by said radially inward disked circumference which is one-ninth the a circumference of said disc.

5. The turf leveling device of claim 3 wherein each blade has a radially inward dished cutting edge.

6. The turf leveling device of claim 2 wherein said knife roller is vertically adjustable relative to said frame.

7. The turf leveling device of claim 3 wherein said discs are secured for rotation with said shaft and blades of axially adjacent discs are displaced circumferentially with rotation of the blades of axially adjacent discs.

8. The turf leveling device of claim 2 including a horizontal grating insert releasably secured to said main frame and disposed between said first metering blade and said first blade and including slots through with said blades extend during rotation of said discs.

* * * * *